United States Patent
Clever et al.

(10) Patent No.: US 8,731,749 B2
(45) Date of Patent: May 20, 2014

(54) SYSTEM AND METHOD FOR OPERATING A VEHICLE CRUISE CONTROL SYSTEM

(75) Inventors: Timothy J. Clever, Waterford, MI (US); Kevin A. Cansiani, St. Clair Shores, MI (US); Ronald E. Gaskins, Kokomo, IN (US)

(73) Assignee: GM Global Technology Operations LLC

( * ) Notice: Subject to any disclaimer, the term of this patent is extended or adjusted under 35 U.S.C. 154(b) by 475 days.

(21) Appl. No.: 13/070,778

(22) Filed: Mar. 24, 2011

(65) Prior Publication Data

US 2012/0191275 A1 Jul. 26, 2012

Related U.S. Application Data

(60) Provisional application No. 61/434,580, filed on Jan. 20, 2011.

(51) Int. Cl.
| | | |
|---|---|---|
| *B60L 3/00* | (2006.01) | |
| *B60L 15/00* | (2006.01) | |
| *G05D 1/00* | (2006.01) | |
| *G05D 3/00* | (2006.01) | |
| *G06F 7/00* | (2006.01) | |
| *G06F 17/00* | (2006.01) | |

(52) U.S. Cl.
USPC .......................................................... 701/21

(58) Field of Classification Search
None
See application file for complete search history.

(56) References Cited

U.S. PATENT DOCUMENTS

| | | |
|---|---|---|
| 4,691,677 A | 9/1987 | Hotate et al. |
| 4,763,264 A | 8/1988 | Okuno et al. |
| 4,919,096 A | 4/1990 | Manaka et al. |
| 5,074,810 A | 12/1991 | Hobbs et al. |
| 5,110,310 A | 5/1992 | Hobbs |
| 5,477,826 A | 12/1995 | Hara et al. |
| 5,700,171 A | 12/1997 | Horton |
| 5,765,528 A | 6/1998 | Kamimaru |
| 6,109,986 A | 8/2000 | Gaynor et al. |
| 6,485,341 B1 | 11/2002 | Lanyi et al. |
| 6,672,282 B2 | 1/2004 | Harrison et al. |
| 6,757,606 B1 | 6/2004 | Gonring |
| 7,214,110 B1 | 5/2007 | Ehlers et al. |
| 7,361,067 B1 | 4/2008 | Smedema |
| 7,877,174 B2 | 1/2011 | Walser et al. |
| 2002/0157639 A1 | 10/2002 | Kidokoro et al. |
| 2004/0153286 A1 | 8/2004 | Yamada |
| 2005/0121005 A1* | 6/2005 | Edwards ...................... 123/525 |
| 2007/0233430 A1 | 10/2007 | Singh |
| 2008/0028387 A1 | 1/2008 | Nakagawa et al. |

(Continued)

OTHER PUBLICATIONS

"Simple Digital systems engine map examples"; waybackmachine(http://web.archive.org/web/20001117173300/http://www.sdsefi.com/techmap.htm); posted Nov. 17, 2000; retrieved Aug. 21, 2013.

*Primary Examiner* — Paul Danneman

(57) ABSTRACT

A control system for a vehicle that includes an engine includes a speed generation module, an airflow determination module, and a throttle control module. The speed generation module generates a desired engine speed during a period after a measured vehicle speed is greater than or equal to a desired vehicle speed, wherein the desired engine speed is based on a difference between the desired vehicle speed and the measured vehicle speed. The airflow determination module determines a desired airflow based on a difference between the desired engine speed and a measured engine speed. The throttle control module determines a desired throttle position based on the desired airflow, and commands a throttle of the engine to the desired throttle position.

20 Claims, 6 Drawing Sheets

(56) References Cited

U.S. PATENT DOCUMENTS

| | | |
|---|---|---|
| 2009/0215331 A1 | 8/2009 | Suzuki et al. |
| 2009/0229568 A1 | 9/2009 | Nakagawa |
| 2010/0152990 A1* | 6/2010 | Bjernetun et al. .............. 701/93 |
| 2012/0191276 A1 | 7/2012 | Clever et al. |
| 2012/0191277 A1 | 7/2012 | Clever et al. |

* cited by examiner

SYSTEM AND METHOD FOR OPERATING A VEHICLE CRUISE CONTROL SYSTEM

CROSS-REFERENCE TO RELATED APPLICATIONS

This application claims the benefit of U.S. Provisional Application No. 61/434,580, filed on Jan. 20, 2011. The disclosure of the above application is incorporated herein by reference in its entirety.

FIELD

The present disclosure relates to vehicle control systems and more particularly to a system and method for operating a vehicle cruise control system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A cruise control system controls a vehicle to maintain a desired speed commanded by an operator of the vehicle. Maintaining the desired speed, however, may be difficult due to a variety of external factors that affect vehicle speed. The cruise control system, therefore, may monitor one or more vehicle operating parameters to compensate for the effects of these external factors. Specifically, the cruise control system may determine whether to increase, decrease, or maintain the vehicle speed based on the one or more vehicle operating parameters.

SUMMARY

A control system for a vehicle that includes an engine includes a speed generation module, an airflow determination module, and a throttle control module. The speed generation module generates a desired engine speed during a period after a measured vehicle speed is greater than or equal to a desired vehicle speed, wherein the desired engine speed is based on a difference between the desired vehicle speed and the measured vehicle speed. The airflow determination module determines a desired airflow based on a difference between the desired engine speed and a measured engine speed. The throttle control module determines a desired throttle position based on the desired airflow, and commands a throttle of the engine to the desired throttle position.

A method for controlling a vehicle that includes an engine includes generating a desired engine speed during a period after a measured vehicle speed is greater than or equal to a desired vehicle speed, wherein the desired engine speed is based on a difference between the desired vehicle speed and the measured vehicle speed, determining a desired airflow based on a difference between the desired engine speed and a measured engine speed, determining a desired throttle position based on the desired airflow, and commanding a throttle of the engine to the desired throttle position.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
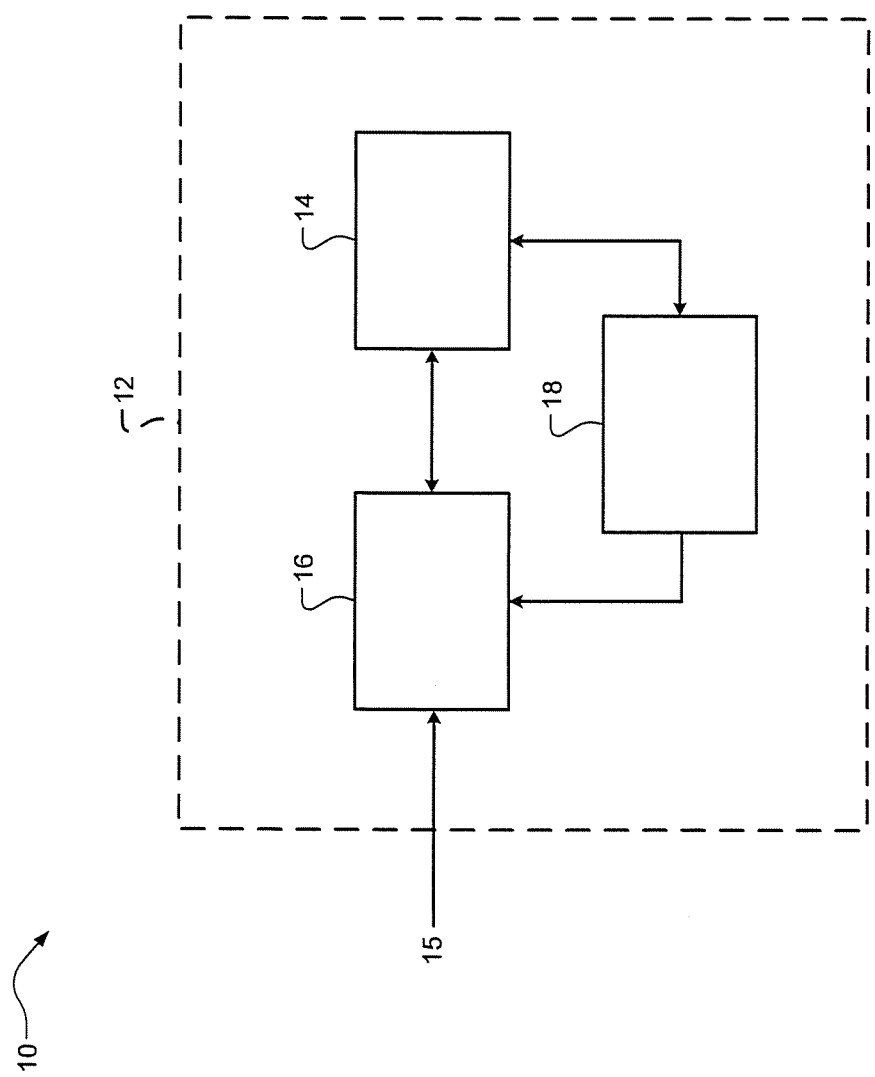
FIG. 1 is a functional block diagram of an example vehicle according to one implementation of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Vehicle cruise control systems may monitor one or more vehicle operating parameters to maintain a desired vehicle speed while compensating for effects of external factors. For example, in marine vehicles (e.g., boats) the external factors may include wind, wakes from other boats, waves, and/or water friction. Conventional engine control systems are speed-density based systems. Rather, these cruise control systems monitor vehicle speed in order to adjust vehicle operation to maintain a desired speed. Marine vehicle speed measurements, however, are slower than vehicle speed measurements in other vehicles such as automobiles. In other words, there is a longer delay between commanding a powertrain of the marine vehicle and a response in the vehicle speed.

Conventional marine vehicle cruise control systems, therefore, may implement combination vehicle speed sensors for additional accuracy and/or improved response. For example, a combination vehicle speed sensor may include both an accelerometer and a global positioning system (GPS) sensor. Combination vehicle speed sensors, however, are expensive. Combination vehicle speed sensors also do not completely eliminate the effects of the delay present in conventional cruise control systems for marine vehicles. Furthermore, conventional speed-based cruise control systems may still suffer from a non-linear cruise control response across all operating speed ranges. For example, the response may be slower at high speeds.

Accordingly, a system and method are presented for improved vehicle cruise control using a single speed input. The system and method may implement a single vehicle speed sensor for measuring vehicle speed. For example, the vehicle speed sensor may be an inexpensive sensor such as a paddlewheel sensor, a GPS sensor, or a sonic sensor. The system and method may also perform airflow-based control of the vehicle speed in combination with speed-density based engine control. Therefore, in contrast to conventional speed density based control, the system and method may achieve a normalized response across all operating speeds. In addition, the system and method may also be used with mass air flow (MAF) based controls to achieve similar results.

Once the vehicle has accelerated to the desired vehicle speed, the system and method may generate a desired engine speed based on a difference between the desired vehicle speed and the measured vehicle speed. For example, a proportional-integral-derivative (PID) controller may be used to generate the desired engine speed based on the difference between the desired vehicle speed and the measured vehicle speed. The system and method may then determine a desired airflow based on a difference between the desired engine speed and a measured engine speed. For example, another PID controller may be used to generate the desired airflow based on the difference between the desired engine speed and the measured engine speed.

The system and method may then determine a desired throttle position based on the desired airflow. While marine vehicles do not include airflow sensors (e.g., MAF sensors), the system and method may perform a reverse lookup of a desired throttle position based on the desired airflow. In other words, the system and method may determine the desired throttle position using a lookup table that maps throttle position to desired airflow. The system and method may then command the throttle to the desired throttle position, and the process may be repeated to maintain the desired vehicle speed with improved accuracy/response while also decreasing costs.

Referring now to FIG. 1, an example vehicle 10 is shown. For example, the vehicle 10 may be a marine vehicle (e.g., a boat). The vehicle 10, however, may also be another type of vehicle such as a consumer vehicle (e.g., an automobile) or an industrial/agricultural vehicle (e.g., a tractor). In some implementations, the system or method of the present disclosure may be implemented in a non-marine vehicle. For example, in non-marine vehicles that include MAF sensors the system or method may generate the desired engine speed based on the difference between desired vehicle speed and measured vehicle speed. The system or method may then control the engine based on the desired engine speed.

The vehicle 10 is propelled by a powertrain system 12. The powertrain system 12 includes a powertrain 14, a control module 16, and sensors 18. The powertrain 14 may include an internal combustion engine. The powertrain 14 may also be a hybrid system and therefore may include additional components such as a battery system and an electric motor. For example, the engine may be a spark ignition, direct injection (SIDI) engine. The engine may also be another suitable type of engine such as a homogeneous charge compression ignition (HCCI) engine or a diesel engine.

The control module 16 controls the powertrain 14. The control module 16 may control the powertrain 14 based on input from an operator of the vehicle 10 (represented by signal 15) and/or measurements from the sensors 18. For example, the control module 16 may control a throttle (not shown) of the powertrain 14 based on the operator input. The sensors 18 may measure various operating parameters of the powertrain 14.

Figure 2:
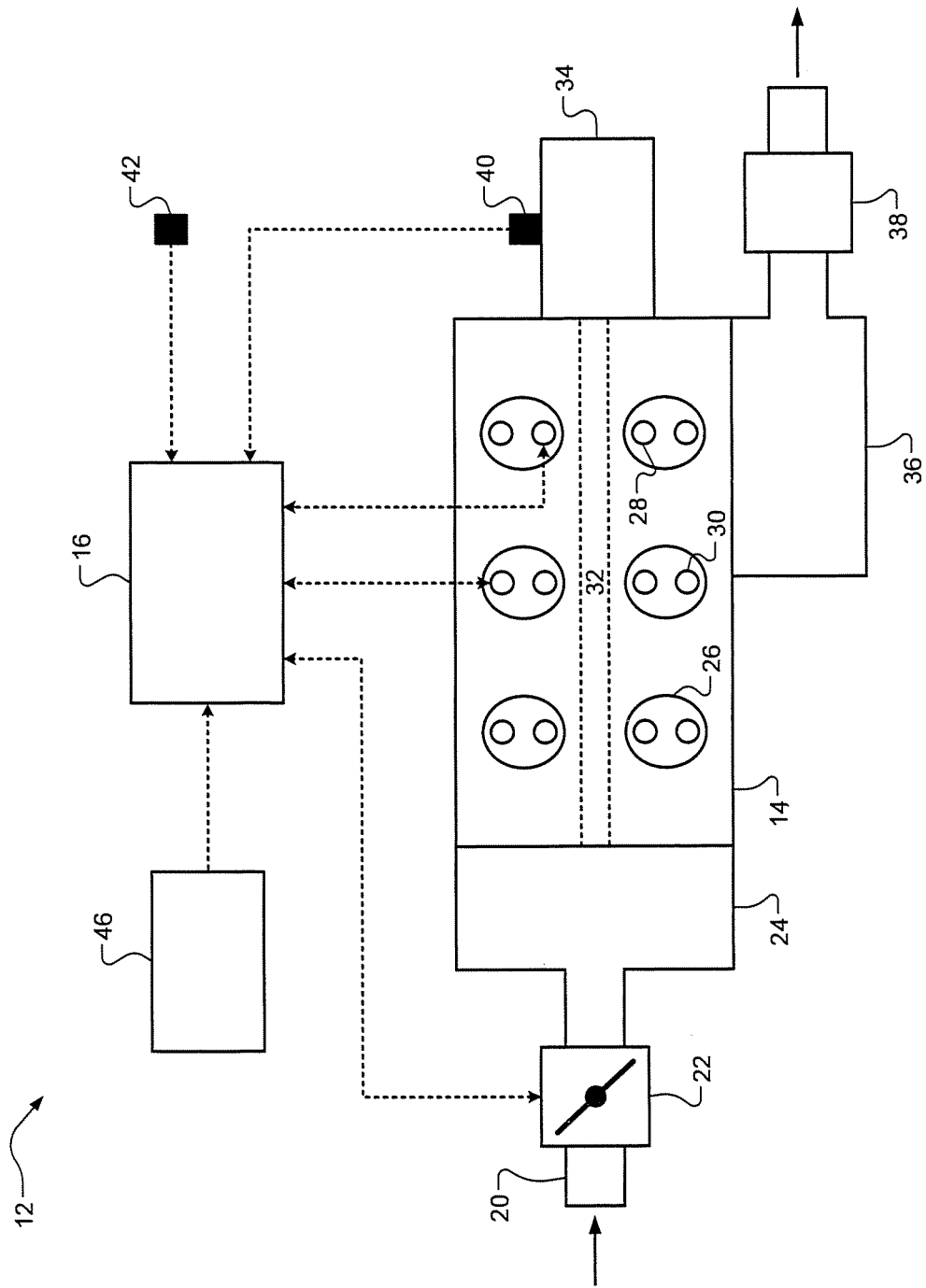
FIG. 2 is a functional block diagram of an example powertrain system according to one implementation of the present disclosure.

Referring now to FIG. 2, an example of the powertrain system 12 is shown. The powertrain system 12 includes a SIDI engine 14. The engine 14 draws air into an intake manifold 24 through an induction system 20 that may be regulated by a throttle 22. The throttle 22 may be electrically controlled by the control module 16 using electronic throttle control (ETC). The air in the intake manifold 24 is distributed to a plurality of cylinders 26 and combined with fuel to create an air/fuel (A/F) mixture. The engine 14 may include fewer than or greater than six cylinders as shown.

The fuel may be injected directly into the cylinders 26 via a plurality of fuel injectors 28, respectively. The A/F mixture is compressed within the cylinders 26 using pistons (not shown). A plurality of spark plugs 30 generate spark to combust the compressed A/F mixture within the cylinders 26, respectively. The combustion of the A/F mixture drives the pistons (not shown) which rotatably turn a crankshaft 32 and generate drive torque. The drive torque may be transferred to a driveline 34 to propel the vehicle. For example, in a marine vehicle the driveline 34 may include a propeller.

Exhaust gas resulting from combustion is expelled from the cylinders 26 into an exhaust manifold 36. The exhaust gas in the exhaust manifold 36 may then be treated by an exhaust treatment system 38 before being released into the atmosphere. For example, the exhaust treatment system 38 may include at least one of oxidation catalysts (OCs), nitrogen oxide (NOx) adsorbers/absorbers, selective catalytic reduction (SCR) systems, particulate matter (PM) filters, and three-way catalytic converters.

The sensors 18 include an engine speed sensor 40 and a vehicle speed sensor 42. The sensors 18 may also include other suitable sensors such as temperature and pressure sensors. The engine speed sensor 40 measures a rotational speed of the driveline 34. For example, the engine speed sensor 40 may measure the rotational speed of the driveline 34 in revolutions per minute (RPM). In some implementations, the engine speed sensor 40 may measure the rotational speed of the crankshaft 32 (i.e., when implementing a 1:1 drive ratio).

The vehicle speed sensor 42 measures a speed of the vehicle 10. The vehicle speed sensor 42 may be a paddle wheel sensor or a GPS sensor. For example, a paddle wheel sensor may be actuated by the flow of water and thus may be suitable for marine vehicles. The vehicle speed sensor 42 may also be another suitable type of sensor that generates a single vehicle speed such as a sonic speed sensor (e.g., sonic, microsonic, ultrasonic, etc.). The operator of the vehicle 10 may control the vehicle 10 via operator input 46. For example, the operator input 46 may include a commanded speed set point (i.e., desired vehicle speed) for cruise control and/or acceleration (e.g., via a throttle lever).

The control module 16 controls operation of the powertrain system 12. The control module 16 may receive signals from the engine speed sensor 40 and the vehicle speed sensor 42 indicating engine speed and vehicle speed, respectively. The control module 16 may also receive signals from other sensors 18. The control module 16 may also receive operator input 46 from an operator of the vehicle 10. The control module 16 may control the throttle 22, the fuel injectors 28, and the spark plugs 30. The control module 16 may also implement the system or method of the present disclosure.

Figure 3:
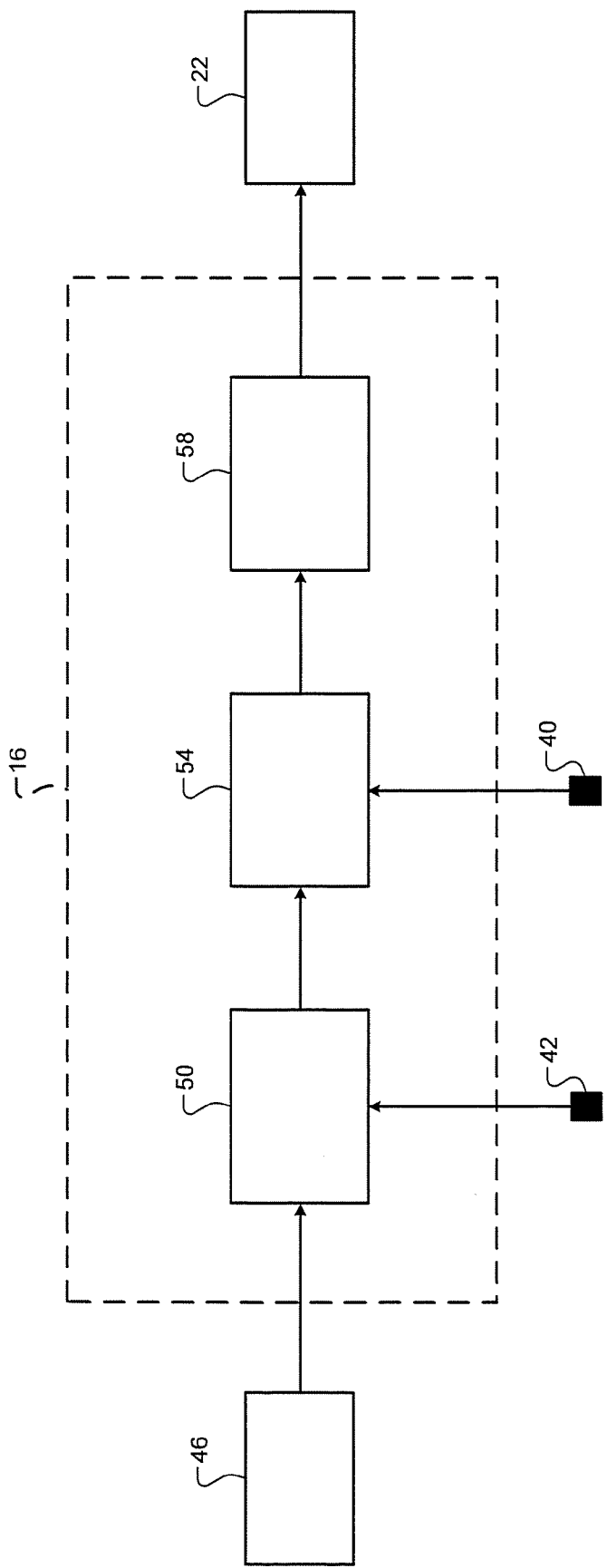
FIG. 3 is a functional block diagram of an example control module according to one implementation of the present disclosure.

Referring now to FIG. 3, an example of the control module 16 is shown. The control module 16 includes a speed generation module 50, an airflow determination module 54, and a throttle control module 58.

The speed generation module 50 receives the desired vehicle speed via operator input 46. The speed generation module 50 also receives the measured vehicle speed from the vehicle speed sensor 42. The speed generation module 50 determines whether the vehicle is operating at steady-state. In other words, the speed generation module 50 may determine whether the measured vehicle speed has accelerated to the desired vehicle speed (e.g., measured vehicle speed desired vehicle speed). The speed generation module 50 then determines a vehicle speed error based on a difference between the desired vehicle speed and the measured vehicle speed. The speed generation module 50 then generates a desired engine speed based on the vehicle speed error. For example, the speed generation module 50 may include a PID controller for generating the desired engine speed based on the vehicle speed error. In some implementations, the speed generation module 50 may generate a control signal indicating either a desired increase or decrease in engine speed instead of a desired engine speed.

The airflow determination module 54 receives the desired engine speed from the speed generation module 50. The airflow determination module 54 also receives the measured engine speed from the engine speed sensor 40. The airflow determination module 54 determines an engine speed error based on difference between the desired engine speed and the measured engine speed. The airflow determination module 54 then generates a desired airflow based on the engine speed error. For example, the airflow determination module 54 may include a PID controller for generating the desired airflow based on the engine speed error.

The throttle control module 58 receives the desired airflow from the airflow determination module 54. The throttle control module 58 determines a desired throttle position based on the desired airflow. Specifically, the throttle control module 58 may perform a reverse lookup to determine the desired airflow. In other words, the throttle control module 58 may include a map of throttle positions for various airflows. For example, the throttle control module 58 may use a lookup table to determine the desired throttle position. Mapping the throttle positions to airflow provides for a normalized response across all vehicle speeds. For example, the normalized response may provide equivalent performance in different situations such as towing a water skier (~28-32 miles per hour, or mph) and teak surfing (~8-10 mph). The throttle control module 58 then controls the throttle 22 based on the desired throttle position. Specifically, the throttle control module 58 may command the throttle 22 to the desired throttle position using ETC.

The control module 16 also provides for asymmetric calibration of vehicle cruise control. Asymmetric calibration refers to particular operating conditions where underspeed or overspeed of the desired vehicle speed is allowed during cruise control. For example, the control module 16 may be calibrated to allow for underspeed while the vehicle is turning. Allowing for underspeed during vehicle turns prevents excessive overshoot and improves post-turn response. For example only, in a marine vehicle the control module 16 may operate at underspeed (i.e., less than the desired vehicle speed) during "double-up" turns (i.e., 180 degree turns). Additionally, for example only, gains of the PID controllers in both the speed generation module 50 and the airflow determination module 54 may be calibratable.

Figure 4A:
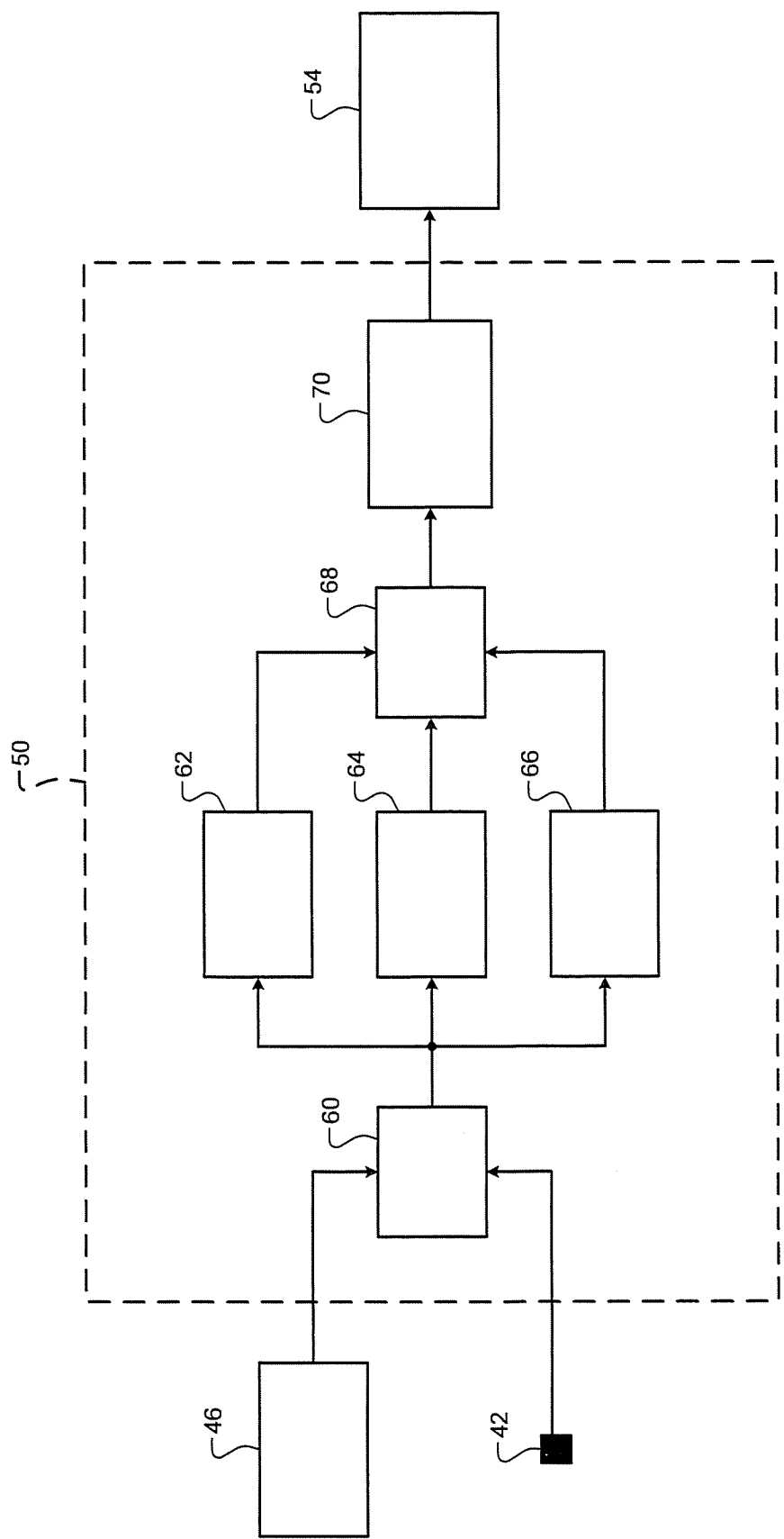
FIG. 4A is a functional block diagram of an example speed generation module according to one implementation of the present disclosure.

Referring now to FIG. 4A, an example of the speed generation module 50 is shown. The speed generation module 50 includes an error module 60, a proportional module 62, an integral module 64, a derivative module 66, a summing module 68, and a desired speed module 70.

The error module 60 calculates a difference ($e_1$) between the desired vehicle speed (via operator input 46) and the measured vehicle speed. The proportional module 62, the integral module 64, and the derivative module 66 each receive the calculated difference $e_1$. The proportional module 62 generates a proportional term ($P_1$) as follows:

$$P_1 = k_{p1} \times e_1 \qquad (1),$$

where $k_{p1}$ is a proportional gain.

The integral module 64 generates an integral term ($I_1$) as follows:

$$I_1 = k_{i1} \times \int_0^t e_1(\tau) d\tau, \qquad (2)$$

where $k_{i1}$ is an integral gain and t is time.

The derivative module 66 generates a derivative term ($D_1$) as follows:

$$D_1 = k_{d1} \times \frac{d}{dt} e_1(t), \qquad (3)$$

where $k_{d1}$ is a derivative gain and it is time.

The summing module 68 calculates a sum of the proportional term $P_1$, the integral term $I_1$, and the derivative term $D_1$. The desired speed module 70 generates the desired engine speed based on the calculated sum. The desired engine speed is then output to the airflow determination module 54.

Figure 4B:
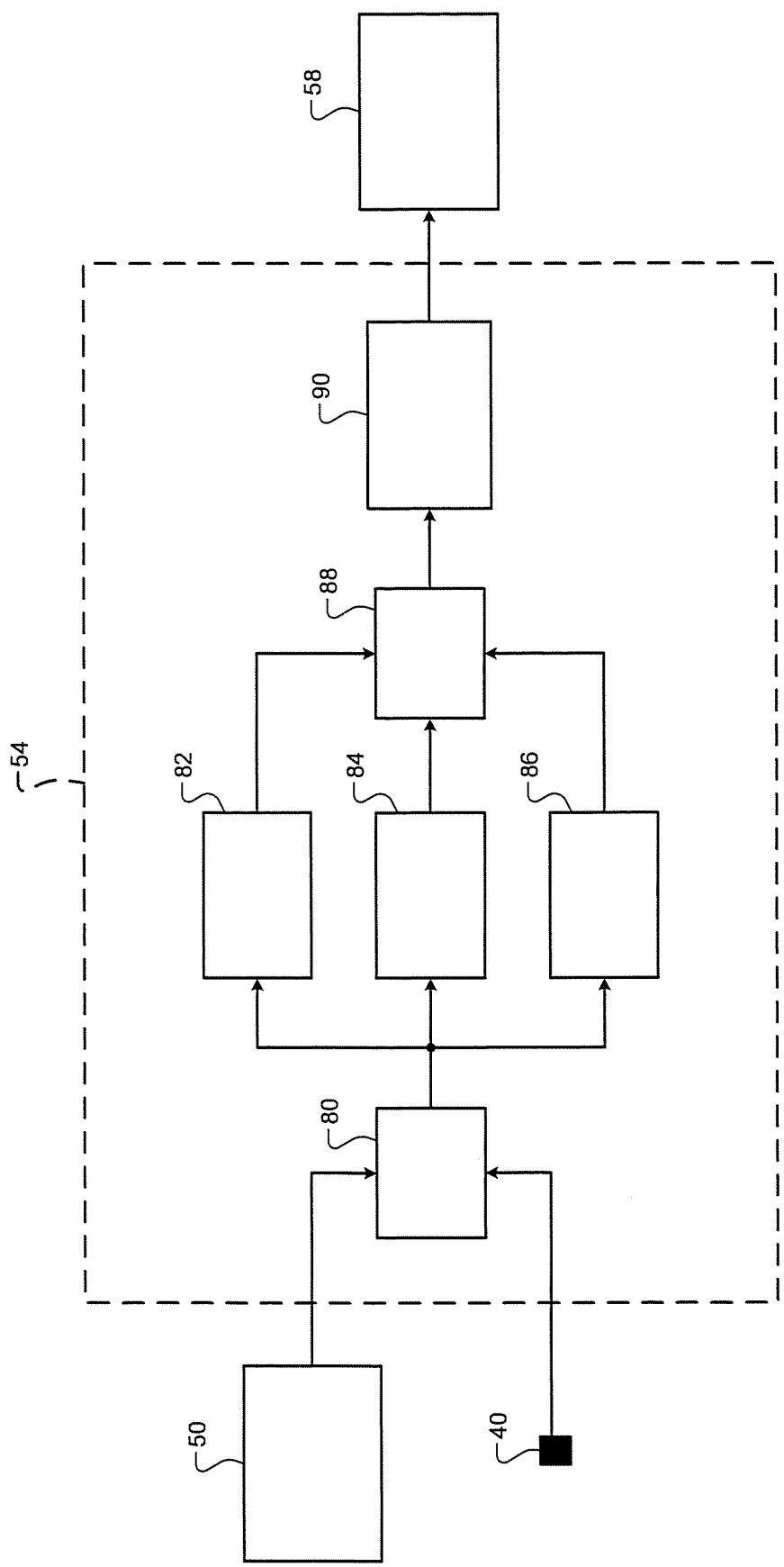
FIG. 4B is a functional block diagram of an example airflow determination module according to one implementation of the present disclosure.

Referring now to FIG. 4B, an example of the airflow determination module 54 is shown. The airflow determination module 54 includes an error module 80, a proportional module 82, an integral module 84, a derivative module 86, a summing module 88, and a desired airflow module 90.

The error module 80 calculates a difference ($e_2$) between the desired engine speed (from the speed generation module 50) and the measured engine speed. The proportional module 82, the integral module 84, and the derivative module 86 each receive the calculated difference $e_2$. The proportional module 82 generates a proportional term ($P_2$) as follows:

$$P_2 = k_{p2} \times e_2 \quad (4),$$

where $k_{p2}$ is a proportional gain.

The integral module 84 generates an integral term ($I_2$) as follows:

$$I_2 = k_{i2} \times \int_0^t e_2(\tau) d\tau, \quad (5)$$

where $k_{i2}$ is an integral gain and t is time.

The derivative module 66 generates a derivative term ($D_2$) as follows:

$$D_2 = k_{d2} \times \frac{d}{dt} e_2(t), \quad (6)$$

where $k_{d2}$ is a derivative gain and t is time.

The summing module 88 calculates a sum of the proportional term $P_2$, the integral term $I_2$, and the derivative term $D_2$. The desired airflow module 90 generates the desired airflow based on the calculated sum. The desired airflow is then output to the throttle control module 58.

Figure 5:
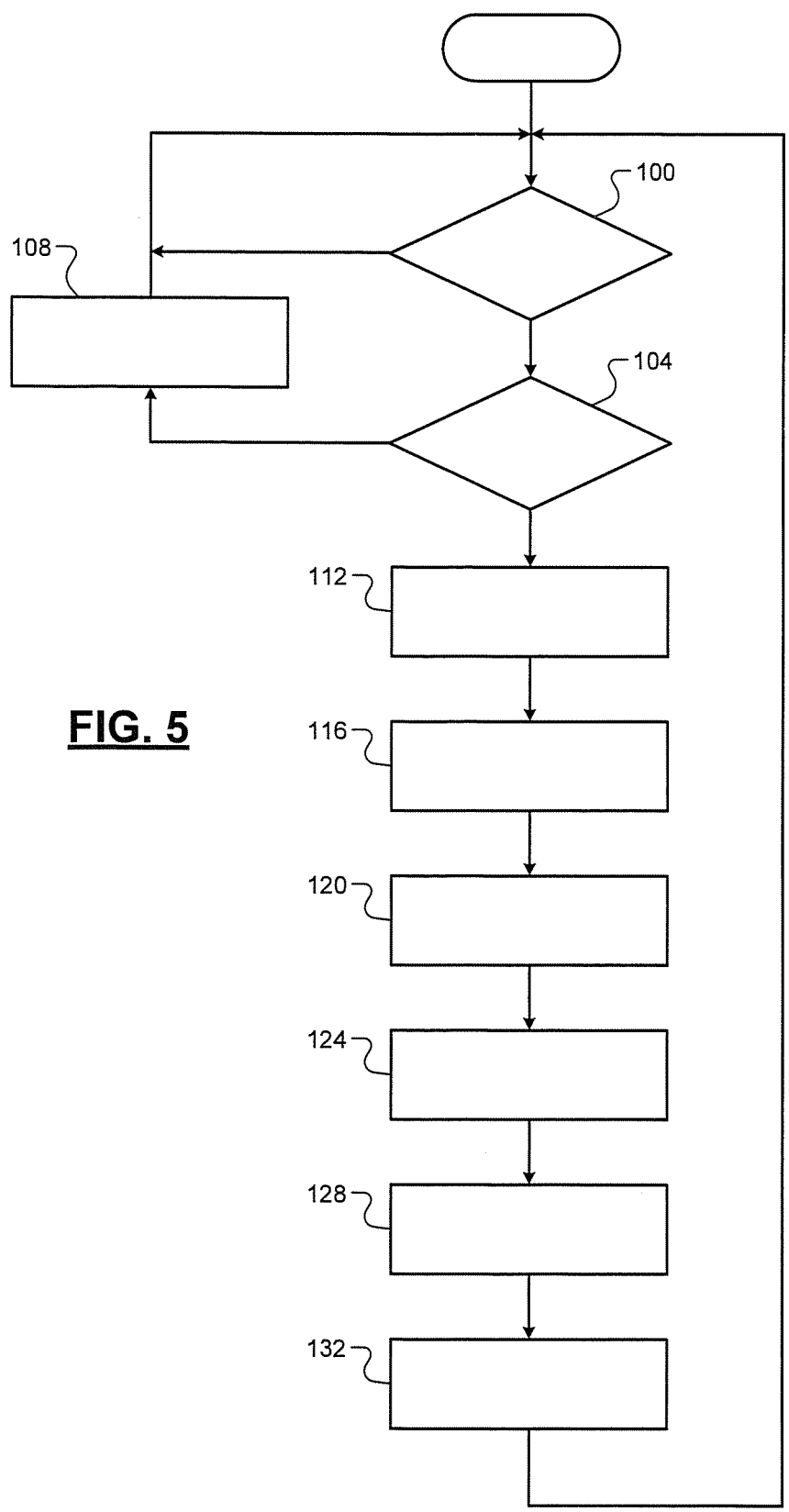
FIG. 5 is a flow diagram illustrating steps of an example method for controlling a vehicle cruise control system according to one implementation of the present disclosure.

Referring now to FIG. 5, an example method of vehicle cruise control begins at 100. At 100, the control module 16 determines whether cruise control is enabled. If true, control may proceed to 104. If false, control may return to 100. At 104, the control module 16 determines whether the desired vehicle speed has been achieved (i.e., whether the measured vehicle speed is greater than or equal to the desired vehicle speed). In other words, the control module 16 determines whether the vehicle 10 is operating at steady-state. If true, control may proceed to 112. If false, control may proceed to 108. At 108, the control module 16 may increase the vehicle speed. Control may return to 100.

At 112, the control module 16 determines a vehicle speed error based on a difference between a desired vehicle speed (commanded by an operator when enabling cruise control) and a measured vehicle speed. At 116, the control module 16 generates a desired engine speed based on the vehicle speed error. At 120, the control module 16 determines an engine speed error based on a difference between the desired engine speed and a measured engine speed. At 124, the control module 16 determines a desired airflow based on the engine speed error. At 128, the control module 16 determines a desired throttle position based on the desired airflow. At 132, the control module 16 commands the throttle 22 to the desired throttle position. Control may then return to 100.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a vehicle that includes an engine, the control system comprising:
a speed generation module that generates a desired engine speed during a period after a measured vehicle speed is greater than or equal to a desired vehicle speed, wherein the desired engine speed is based on a difference between the desired vehicle speed and the measured vehicle speed;
an airflow determination module that determines a desired airflow based on a difference between the desired engine speed and a measured engine speed; and
a throttle control module that determines a desired throttle position based on the desired airflow, and that commands a throttle of the engine to the desired throttle position.

2. The control system of claim 1, wherein the throttle control module determines the desired throttle position based on the desired airflow using a lookup table that maps throttle position to airflow.

3. The control system of claim 1, wherein the speed generation module, the airflow determination module, and the throttle control module are calibratable to provide for asymmetric control of the vehicle speed.

4. The control system of claim 3, wherein the speed generation module, the airflow determination module, and the throttle control module allow for underspeed control of the vehicle speed while the vehicle is turning.

5. The control system of claim 1, wherein the speed generation module calculates proportional, integral, and derivative (PID) terms based on the difference between the desired vehicle speed and the measured vehicle speed.

6. The control system of claim 5, wherein the speed generation module generates the desired engine speed based on a sum of the PID terms.

7. The control system of claim 1, wherein the airflow determination module determines proportional, integral, and derivative (PID) terms based on the difference between the desired engine speed and the measured engine speed.

8. The control system of claim 7, wherein the airflow determination module determines the desired airflow based on a sum of the PID terms.

9. The control system of claim 1, wherein the vehicle is a marine vehicle.

10. The control system of claim 9, wherein the measured vehicle speed is measured using one of a paddlewheel sensor, a global positioning system (GPS) sensor, and a sonic sensor.

11. A method for controlling a vehicle that includes an engine, the method comprising:
generating a desired engine speed during a period after a measured vehicle speed is greater than or equal to a desired vehicle speed, wherein the desired engine speed is based on a difference between the desired vehicle speed and the measured vehicle speed;
determining a desired airflow based on a difference between the desired engine speed and a measured engine speed;
determining a desired throttle position based on the desired airflow; and
commanding a throttle of the engine to the desired throttle position.

12. The method of claim 11, further comprising determining the desired throttle position based on the desired airflow using a lookup table that maps throttle position to airflow.

13. The method of claim 11, wherein the generation of the desired engine speed, the determination of the desired airflow, and the determination of the desired throttle position are calibratable to provide for asymmetric control of the vehicle speed.

14. The method of claim 13, wherein the generation of the desired engine speed, the determination of the desired airflow, and the determination of the desired throttle position allow for underspeed control of the vehicle speed while the vehicle is turning.

15. The method of claim 11, further comprising calculating proportional, integral, and derivative (PID) terms based on the difference between the desired vehicle speed and the measured vehicle speed.

16. The method of claim 15, further comprising generating the desired engine speed based on a sum of the PID terms.

17. The method of claim 11, further comprising determining proportional, integral, and derivative (PID) terms based on the difference between the desired engine speed and the measured engine speed.

18. The method of claim 17, further comprising determining the desired airflow based on a sum of the PID terms.

19. The method of claim 11, wherein the vehicle is a marine vehicle.

20. The method of claim 19, further comprising measuring the vehicle speed using one of a paddlewheel sensor, a global positioning system (GPS) sensor, and a sonic sensor.

* * * * *